(12) United States Patent
Janssens et al.

(10) Patent No.: US 7,937,231 B2
(45) Date of Patent: May 3, 2011

(54) ORDER TRACKING METHOD AND SYSTEM

(75) Inventors: Karl Hans Bert Janssens, Kessel-lo (BE); Pieter Frans Van Vlierberghe, Kessel-lo (BE); Herman Van Der Auweraer, Lubbeek-Linden (BE)

(73) Assignee: LMS International NV, Leuven (BE)

( * ) Notice: Subject to any disclaimer, the term of this patent is extended or adjusted under 35 U.S.C. 154(b) by 130 days.

(21) Appl. No.: 12/363,801

(22) Filed: Feb. 2, 2009

(65) Prior Publication Data
US 2010/0288051 A9 Nov. 18, 2010

(30) Foreign Application Priority Data

Feb. 2, 2008 (EP) ..................................... 08150992

(51) Int. Cl.
*G01H 11/00* (2006.01)
(52) U.S. Cl. ............ 702/75; 702/145; 702/147; 73/570; 73/660; 73/649; 73/504.16; 73/504.12
(58) Field of Classification Search .................... 702/56, 702/75, 35, 36, 183, 182, 165, 145, 147; 73/460, 462, 570, 660, 504.12, 504.16
See application file for complete search history.

(56) References Cited

U.S. PATENT DOCUMENTS

| | | | | |
|---|---|---|---|---|
| 3,938,394 A * | 2/1976 | Morrow et al. | ................. | 73/462 |
| 5,412,985 A * | 5/1995 | Garcia et al. | .................... | 73/460 |
| 5,825,657 A * | 10/1998 | Hernandez | .................... | 702/182 |
| 6,324,487 B1 * | 11/2001 | Qian et al. | .................... | 702/147 |
| 6,332,116 B1 * | 12/2001 | Qian et al. | .................... | 702/183 |
| 6,351,714 B1 * | 2/2002 | Birchmeier | ...................... | 702/56 |
| 6,366,862 B1 * | 4/2002 | Qian et al. | ....................... | 702/35 |
| 6,801,873 B1 * | 10/2004 | Jin et al. | ......................... | 702/147 |
| 6,810,341 B2 * | 10/2004 | Qian et al. | ....................... | 702/75 |
| 7,321,809 B2 * | 1/2008 | Vian et al. | ..................... | 700/279 |
| 7,363,111 B2 * | 4/2008 | Vian et al. | ..................... | 700/279 |
| 2002/0052714 A1 * | 5/2002 | Qian et al. | .................... | 702/183 |
| 2004/0186680 A1 * | 9/2004 | Jin et al. | ......................... | 702/147 |

OTHER PUBLICATIONS

Bonnardot et al., "Use of the acceleration signal of a gearbox in order to perform angular resampling (with limited speed fluctuation)", *Mechanical Systems and Signal Processing*, London, GB, vol. 19, No. 4, Jul. 1, 2005, pp. 766-785 (XP004863160).
Blough J.R., "A survey of DSP methods for rotating machinery analysis, what is needed, what is available", *Journal of Sound and Vibration Academic Press*, UK, vol. 262, No. 3, May 1, 2003, pp. 707-720 (XP002488357).
Search Report of European Patent Office relating to European Patent Application No. EP 0 815 0992.9, Jul. 31, 2008.

\* cited by examiner

*Primary Examiner* — Carol S Tsai
(74) *Attorney, Agent, or Firm* — Bacon & Thomas, PLLC

(57) ABSTRACT

The present invention describes an order tracking system (200) and method (100) for tracking at least one order from mechanical and/or acoustic vibrations generated by a periodic excitation process of a physical system. The order tracking system (200) comprises a means for obtaining (212) a mechanical and/or acoustic vibration data of a physical system and a means for obtaining (214) system reference data. It further comprises a means for combining (224) the mechanical and/or acoustic vibration data with the system reference data and a means for applying (226) a digital FIR filter to at least the mechanical and/or acoustic vibration data for deriving based thereon at least one order.

24 Claims, 5 Drawing Sheets

ORDER TRACKING METHOD AND SYSTEM

TECHNICAL FIELD OF THE INVENTION

The present invention relates to methods and systems for studying vibrational and/or acoustic phenomena. More particularly, the present invention relates to methods and systems for tracking orders in the study or analysis of mechanical vibrations and/or noise of physical systems as well as to the application thereof.

BACKGROUND OF THE INVENTION

Sound and vibration phenomena often are analysed in order to optimise them, e.g. to reduce the amount of disturbance that is generated for a user or the environment, to make a product compliant with specifications or with regulations set or to identify sources of disturbance, to control a system, etc. A known way for sound and vibration analysis is making use of order tracking. Order tracking typically is applied to variable-speed systems generating sound or another mechanical vibration.

Order tracking concerns the extraction of the complex envelope of order components from measured mechanical and/or acoustic vibrations. Orders are harmonic components of which the kernel frequency is a multiple or fraction of the angular speed of the periodic excitation.

The oldest order tracking technique is based on performing Fourier Transforms on time domain data. Fourier Transforms with constant kernel frequencies are used. The transformed data is displayed in either a waterfall or color map format. Orders of interest are then estimated through determining the average frequency of each order over which the Fourier Transforms were performed and extracting the corresponding frequency lines. The limitations of these techniques are many and can be significant. The two largest limitations are limited order resolution at lower rotational speeds and slow sweep rates.

Considerable improvements in order tracking were achieved since the late eighties. DC-estimation techniques were developed in which the Fourier Transform kernels explicitly take account of the changes in rotational speed. Two variants of DC-estimation methods exist, i.e. DC estimation in the angle-domain and DC estimation in the time-domain. The angle-domain variant, also referred to as resampling-based order tracking, is for example known from U.S. Pat. No. 6,351,714. The method is based on a limited observation interval of the angle-sampled signal $x(\alpha)$, during which the complex order component envelopes $X_k(\rho(\alpha))$, being a function of the rotational speed $\rho$ which is a function of the angle $\alpha$, are assumed to be constant. An interval $[\theta-\Delta\alpha, \theta+\Delta\alpha]$ is picked wherein $x(\alpha)$ is periodic with period Q and wherein the variation of the angle $\Delta\alpha = Q\pi$. $1/Q$ is also known as the order resolution. The order is then estimated as follows:

$$\hat{X}_k(\rho(\theta)) = \int_{\theta-\Delta\alpha}^{\theta+\Delta\alpha} C_w W(\alpha) x(\alpha) e^{\frac{jk\alpha}{Q}} d\alpha \quad [1]$$

wherein $W(\alpha)$ is a windowing function to avoid leakage and $C_w$ is a window correction factor. By moving the independent variable to the time-domain, we obtain the time-domain variant, which is mathematically equivalent and often referred to as time-variant DFT. The time-variant DFT formulation is as follows:

$$\hat{X}_k(\rho(T)) = \int_{T_0}^{T_1} C_w W(\alpha(t)) x(t) e^{\frac{jk\alpha(t)}{Q}} \frac{d\alpha}{dt} dt \quad [2]$$

where:

$\alpha(T)=0$ $\alpha(T_0)=\theta-\Delta\alpha$ $\alpha(T_1)=\theta+\Delta\alpha$ The weakness of the DC-estimation approach is the assumption that the order $X_k(\rho(\alpha))$ must be constant over the observation interval. It assumes a zero angle-domain order bandwidth, i.e. $B^{\alpha}_k$ (1/rad)=0. However, this assumption is only true at constant rotational speed. When the rotational speed $\rho$ changes in the observation interval, which is obviously the case in run-up and coast-down measurements, $B^{\alpha}_k$ is not longer zero and the DC-estimation method starts suffering from order crosstalk. Orders then leak into adjacent ones and cannot be longer separated. The cross-talk and resulting DC-estimation errors increase with (i) decreasing order spacing $1/Q$, (ii) decreasing rotational speed $\rho$, (iii) increasing angular acceleration $d\rho/dt$ and (iv) increasing order bandwidth $B^{\rho}_k$ (s/rad) in the rotational speed domain. Here, $B^{\rho}_k$ characterizes the order envelope variations with rotational speed. $B^{\rho}_k$ is a system characteristic which depends on the system transfer function characteristics.

Another known and widely-used type of order tracking technique is referred to as a Vold-Kalman order tracking approach for rotating machinery. This time-domain method centres the order of interest about DC and applies a particular type of low-pass filter to the phasor-shifted data. The Vold-Kalman order tracking filter acts as an autoregressive, IIR type of filter with a limited number of poles. The tracking characteristics of the filter are determined by the HCF (Harmonic Confidence Factor) weighting parameter. Undesired phase distortions on the order estimates are minimized by adopting a total Least Squares solution algorithm. This algorithm estimates the full order envelope at once from the complete data signal. However, this makes the Vold-Kalman approach computationally very heavy and explains its off-line character and use.

There is a further need for good methods and systems for order tracking, being accurate and at the same time computational efficient.

SUMMARY OF THE INVENTION

It is an object of embodiments of the present invention to provide good apparatus or methods for order tracking in the study of a noise and/or mechanical vibration of a physical system and methods and systems using them. It is an advantage of embodiments according to the present invention that an accurate order tracking technique is obtained. It is furthermore an advantage according to embodiments according to the present invention that a computational efficient order tracking technique is obtained. It is an advantage of embodiments according to the present invention that the technique is user friendly and can be tailored depending on the user's needs. The above objective is accomplished by a method and device according to the present invention.

The present invention relates to an order tracking system for tracking at least one order from mechanical and/or acoustic vibrations generated by a periodic excitation process of a physical system, the order tracking system comprising a means for obtaining mechanical and/or acoustic vibration data of a physical system, a means for obtaining system reference data characterizing the angular speed of the excitation process, a means for combining the mechanical and/or acoustic vibration data with the system reference data, and a means for applying a digital FIR filter to at least the mechanical and/or acoustic vibration data for deriving based thereon at least one order. The excitation process may be a stationary or variable speed excitation process. It is an advantage of embodiments according to the present invention that a high accuracy can be obtained. It is an advantage of embodiments according to the present invention that an efficient computational technique is obtained.

It is an advantage of embodiments according to the present invention that the FIR low-pass filter can be a sharp filter. It is an advantage of embodiments according to the present invention that the user only needs to specify the order resolution and attenuation of the filter. In other words, it is an advantage of embodiments according to the present invention that it provides a user-friendly technique for performing order tracking. It is an advantage of embodiments according to the present invention that, in contrast to the hard-to-understand parameters used in the Vold-Kalman approach, such as e.g. the HCF weighing factor, the resolution and attenuation parameters of the FIR filter are understandable and have a clear influence on the result.

The system reference data may be an angular speed of the periodic excitation process, a multiple or fraction of it, a corresponding oscillator, a tacho pulse train, or any variable derived there from.

The order tracking system may operate in the angle-domain.

The order tracking system may be adapted to operate an adaptive FIR filter in the time-domain.

It is an advantage of embodiments according to the present invention that the order tracking method and system can be based both on an angle-domain formulation of the order tracking technique and/or on a time-domain formulation of the order technique.

The means for applying a digital FIR filter may be adapted for applying a digital low pass FIR filter to the combined mechanical and/or acoustic vibration data and the system reference data.

The means for combining the mechanical and/or acoustic vibration data and the system reference data may be a means for multiplying the mechanical and/or acoustic vibration data with an order carrier wave of which the frequency evolution is a multiple or fraction of an angular speed of the periodic excitation process.

The means for obtaining mechanical and/or acoustic vibration data may be adapted for obtaining a sampled mechanical and/or acoustic vibration data in different finite observation frames wherein the data may be periodic. The multiplying may be performed once per corresponding observation interval using the data in this observation interval.

The means for obtaining mechanical and/or acoustic vibration data may be adapted for obtaining sampled mechanical and/or acoustic vibration data in different finite observation frames and the means for applying the digital FIR filter may be adapted for performing the FIR filter once per observation frame.

The means for applying a digital FIR filter may be a means for applying a digital FIR filter having a cut-off frequency which is smaller than half an order resolution of the order of interest. It is an advantage of embodiments according to the present invention that the system allows good distinction between the different orders in the order tracking technique.

A FIR filter design of the FIR filter may be a trade off between the amount of data needed to run the filters, the computation effort required and the accuracy of the filter.

The system furthermore may comprise a means for detecting the mechanical and/or acoustic vibrations from the physical system and converting it in mechanical and/or acoustic vibration data.

The system reference data may be indicative of a periodic process. The system reference data may be constant. The system reference data may be non-stationary.

It is an advantage of embodiments according to the present invention that the complex order envelopes $X_k(\rho(\alpha))$ can vary in the observation period. As long as the order bandwidth is limited, e.g. the order bandwidth $B^\alpha_k < 0.5/Q$, an order component can be very well separated from the adjacent ones. The latter allows an improved technique for order tracking, resulting in a better resolving of the different orders. Embodiments according to the present invention thus result in an analysis technique whereby a good accuracy can be obtained.

The order sampling rate may be selectable by the user.

The order tracking system furthermore may comprise an output means for putting out order information.

A Fourier Transform based computation scheme may be adopted. It is an advantage of embodiments according to the present invention that such a Fourier Transform based computation may be applied for both the angle and time domain variants. It is an advantage of embodiments according to the present invention that such a Fourier Transform based computation may yield the same results, but may have better performance for high channel count/orders.

The means for combining and means for applying may comprise means for obtaining a Fourier Transform of the mechanical and/or acoustic vibration data, means for obtaining a Fourier Transform of a band-pass FIR filter and means for combining the Fourier Transform of the mechanical and/or acoustic vibration data and the Fourier Transform of the band-pass FIR filter.

The present invention also relates to an entity comprising a physical system and an order tracking system as described above, wherein the order tracking system is adapted to provide information to the physical system regarding its mechanical vibration frequency spectrum.

The present invention furthermore relates to an entity comprising a simulation system and an order tracking system as described above, the simulation system being adapted to provide simulation of a mechanical vibration signal(s) using order information generated with said order tracking system.

The present invention also relates to a method for tracking at least one order from mechanical and/or acoustic vibrations generated by a periodic excitation process of a physical system, the method comprising obtaining mechanical and/or acoustic vibration data of a physical system, obtaining system reference data characterising the angular speed of the excitation process, combining the mechanical and/or acoustic vibration data and the system reference data and applying a digital FIR filter to at least the mechanical and/or acoustic vibration data.

The method for tracking of at least one order may be operated in the angle-domain.

Applying a FIR filter may comprise applying an adaptive FIR filter in the time-domain.

Applying a digital FIR filter may comprise applying a digital low pass FIR filter to the combined mechanical and/or acoustic vibration data and the system reference data.

Combining the mechanical and/or acoustic vibration data and the system reference data may comprise multiplying the mechanical vibration frequency data and an order carrier wave of which the frequency evolution is a multiple or fraction of an angular speed of the periodic excitation process.

Obtaining a mechanical and/or acoustic vibration data may comprise obtaining a mechanical and/or acoustic vibration data in different observation frames and combining may be performed once per observation interval.

Combining and applying may comprise obtaining a Fourier Transform of the mechanical and/or acoustic vibration data, obtaining a Fourier Transform of a band-pass FIR filter, and combining the Fourier Transform of the mechanical and/or acoustic vibration data and the Fourier Transform of the band-pass FIR filter.

Obtaining a mechanical and/or acoustic vibration data may comprise obtaining a mechanical and/or acoustic vibration data in different observation frames and applying a digital FIR filter may comprise applying a digital FIR filter once per observation frame.

The method may comprise controlling a physical system as function of said derived order information.

The method may comprise simulating a mechanical and/or acoustic vibration using said derived order information.

The present invention also relates to a computer program product for executing the method as described above and below.

The present invention furthermore relates to a machine-readable data storage device storing such a computer program product and/or the transmission of such a computer program product over a local or wide area telecommunications network.

It is an advantage of embodiments according to the present invention that a high performance level for the analysis, more particularly for the order tracking process, can be obtained.

It is an advantage of embodiments according to the present invention that systems and methods are provided that allow to deal with mechanical vibration signals or corresponding data having a rapidly varying order content, such as for example mechanical vibration signals or corresponding data stemming from rotating machinery having a fast run-up and/or coast down.

It is an advantage of embodiments according to the present invention that the systems and methods for order tracking can be applied in real-time, allowing a more efficient study e.g. analysis, evaluation, control and/or simulation.

It is an advantage of embodiments according to the present invention that computation for the order tracking technique can start as soon as a data frame with the length of the filter window for the FIR filter is available. It is an advantage of embodiments according to the present invention that the filter does not require future data. The latter results in the advantage that the order tracking methods and systems according to embodiments of the present invention can be applied in an on-line fashion, i.e. in real time. It is an advantage of embodiments according to the present invention that the methods and systems do not require the measurement of the complete signals or corresponding data before the order envelope can be computed, in contrast to e.g. the Vold-Kalman approach.

It is an advantage of embodiments according to the present invention that the computational effort required to perform the order tracking technique is limited. This is a result of at least the fact that the order envelope is not to be computed sample by sample. Applying the filter multiplication only once per observation frame may be sufficient to obtain an appropriate result. The order tracking technique therefore may be down deciminated, depending on the required accuracy. It thus is an advantage of embodiments according to the present invention that the filter is not auto-regressive.

It is an advantage of embodiments according to the present invention that the filter can produce a sharp cut-off, while remaining computationally efficient.

Particular and preferred aspects of the invention are set out in the accompanying independent and dependent claims. Features from the dependent claims may be combined with features of the independent claims and with features of other dependent claims as appropriate and not merely as explicitly set out in the claims.

The teachings of the present invention permit the design of improved methods and apparatus for studying, evaluating, optimising and/or simulating mechanical vibration or noise in physical systems.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
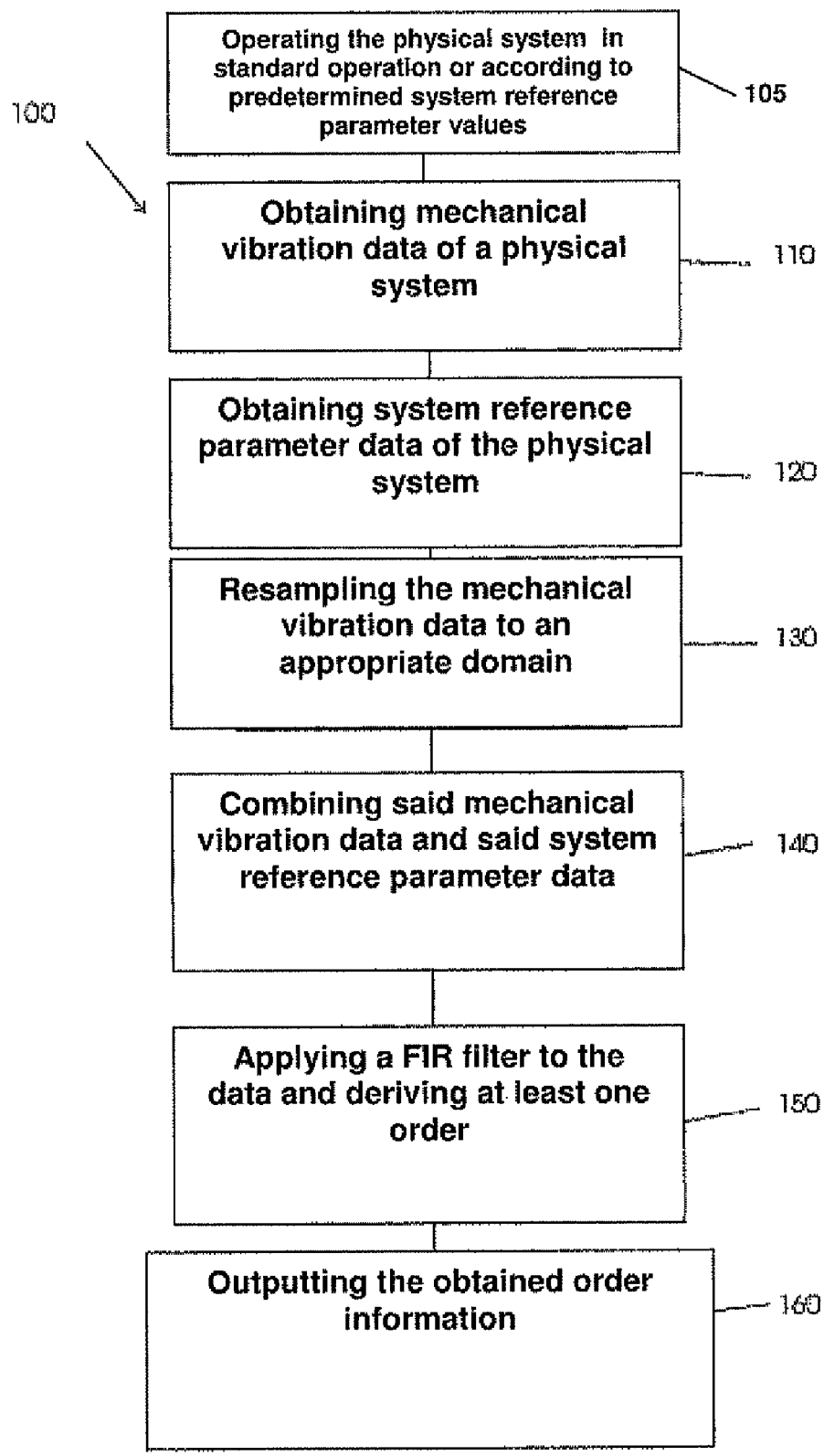
FIG. 1 is a schematic diagram of different standard and optional steps in a method for order tracking according to an embodiment of the first aspect of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention. The term "order" relates to frequencies in the vibration frequency spectrum that are related to a system reference parameter, such as for example a rotation speed of a component of the physical system. The term "order" can be seen as a harmonic of a given baseline signal or corresponding data generated by a periodic process in the physical system under study. Such a related frequency may correspond with a fraction or a multiple of a variation frequency of a system reference parameter. Orders in the vibration frequency spectrum may have a significant larger amplitude in the vibration frequency spectrum than the remaining part of the vibration frequency spectrum.

With "Finite Impulse Response filter" or "FIR filter" a category of digital filters is envisaged. The FIR filter is characterized in that the impulse response of the filter, i.e. the filter's response to a Kronecker delta input, is 'finite' because it settles to zero in a finite number of sample intervals. An Nth order FIR filter has a response to an impulse that is N+1 samples in duration. The filters have the advantage that they are inherently stable due to the fact that all poles are located at the origin. The filters require no feedback and have only very limited phase distortion.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to a method for tracking an order in mechanical and/or acoustic vibration signals or corresponding data. Such mechanical and/or acoustic vibration signals may for example be caused by a periodic process in the physical system to be measured. This may be a rotating component in the physical system, an electrical ignition, etc. The order tracking method comprises obtaining mechanical vibration data of a physical system and obtaining system reference data. Such system reference data thus may be representative for a phenomenon inducing a baseline frequency signal or corresponding data and thus may influence the mechanical and/or acoustic vibration signals and corresponding data generated and consequently also the orders present in the mechanical and/or acoustic vibration signals or corresponding data generated by the physical system. It may be an angular speed, a rotational speed, a tacho pulse train, an order oscillator, etc. The method further comprises combining the mechanical vibration data with the system reference data and applying a digital Finite Impulse Response (FIR) filter to the data. Combining the mechanical and/or acoustic vibration data and the system reference data may be combination of the mechanical and/or acoustic vibration data with a rotational speed RPM, with a tacho pulse train, with an order oscillator, with an order carrier wave, etc. Such combining may be demodulating the mechanical and/or acoustic vibration data. In one example, combining the data may comprise multiplying the mechanical and/or acoustic vibration data with the order carrier wave, of which the kernel frequency is a multiple or fraction of the reference angular speed, where after a digital Finite Impulse Response (FIR) low-pass filter is applied to the combined data. In another example, a Fourier Transform is applied to a band-pass FIR filter and to the mechanical and/or acoustic vibration data which then are combined, e.g. by multiplying the spectral lines. Combination of the mechanical and/or acoustic vibration data and the system reference data and applying a digital FIR filter then is performed indirectly by generating a band-pass FIR filter, which implies centering of a FIR filter around the carrier frequency of the order whereby the system reference data is used for determining the carrier frequency order, and by combining the Fourier Transform of the digital FIR filter with the Fourier Transform of the mechanical vibration data. Application of the FIR filter according to embodiments of the present invention results in good accuracy, a user-friendly system and a computational efficient system. Based on the filtered results, at least one order can be identified, and thus tracked. In embodiments of the present invention order information such as for example the amplitude and/or phase profile of an order thus may be tracked using a combination of the mechanical and/or acoustic vibration data per observation interval with the order carrier wave, and using a sharp FIR filter, with limited phase distortion on it. The methods and systems according to the present invention may be suitable for studying, analysing, evaluating, controlling, adjusting or simulating physical systems based on mechanical vibrations. Such mechanical vibrations may for example be noise, strain, a vibration, etc. The mechanical vibrations under study thereby may be induced by a periodic process influenced or determined by a system reference parameter. The periodic process may be a repetitive process. Such a periodic process may for example be rotation of a component of a system, e.g. in rotational machinery, electric ignition in a motor, etc.

By way of illustration, the present invention not being limited thereto, an exemplary method according to an embodiment of the present invention will be described with reference to FIG. 1, indicating standard and optional steps of such a method.

The method 100 for order tracking may be performed on a mechanical and/or acoustic vibration data of a physical system in operation, e.g. standard operation, predetermined test conditions etc. The mechanical and/or acoustic vibrations may be any type of mechanical and/or acoustic vibration, such as for example, but not limited to, a noise. The mechanical and/or acoustic vibrations may be caused by any type of system, e.g. a physical system. Such physical systems may for example be engines, gear boxes, exhaust systems, electrical generators, pumps, etc. It may be caused by one or more pieces of rotating machinery. It may for example be caused by rotating physical elements, such as for example rotating shaft. The latter may be running at constant speed or at non-stationary speed. Such a method may be used for analysing a system, for evaluating it, for optimising the physical system with respect to the mechanical vibration, e.g. for reducing the mechanical vibration or reducing certain components of the mechanical vibration, as input for simulating a mechanical vibration, etc. The physical system may be operated in standard operating conditions. The physical system may be operated according to a ramp up or coast down experiment. For example, when using rotating machinery, the experiment may comprise a ramp up or coast down of the rotation speed. The method thus may comprise a step of operating 105 the physical system according to predetermined system reference data. The reference data preferably is varied over the experiment. Such variation thus may be an increase, decrease or a combination thereof. Other physical phenomena generating a mechanical vibration also may be studied.

The method of order tracking 100 comprises obtaining 110 data for a mechanical and/or acoustic vibration data from a physical system. A dedicated detection of data for the mechanical and/or acoustic vibration signal or corresponding data from the physical system may be performed. Such detection may be performed using a dedicated detector, such as for example an accelerometer for detection of mechanical vibrations, a microphone for detecting acoustic pressure variations, a strain sensor to measure strains, a P-U Microflown probe to measure acoustic particle velocity and intensity, etc. Alternatively, or in addition thereto, obtaining data for a mechanical and/or acoustic vibration data may comprise receiving data regarding a mechanical and/or acoustic vibration signal detected from the physical system, e.g. a pre-stored signal, a realtime recorded signal, etc.

The method of order tracking 100 furthermore comprises obtaining 120 data of a system reference signal, i.e. also referred to as system reference data or system reference parameter values. Such a system reference signal characterizes the periodic excitation process, being either stationary or varying in speed. For a rotating system, this may for example be the angular speed or rotational speed of one of the rotating shafts, or a multiple or fraction of it, a corresponding oscillator, a tacho pulse train or an order carrier wave, the invention not being limited thereto. The system reference data may be recorded using a suitable detection technique. Alternatively or in addition thereto, obtaining data of a system reference data may comprise receiving data regarding a system reference signal, e.g. pre-stored data, real-time recorded data, etc.

It is to be noticed that the steps for obtaining information may be interchanged, i.e. obtaining of the system reference data and obtaining the mechanical and/or acoustic vibration data may be done one after the other, in whatever order or simultaneously.

In the method, a resampling 130 of the measured mechanical and/or acoustic vibration data to an another domain, e.g. resampling from a time domain to an angle domain, may be performed. In one embodiment, such a resampling may be performed by using the system reference data. Furthermore such system reference data may be used as a reference point. In other embodiments according to the present invention, the measured mechanical and/or acoustic vibration data may be obtained directly in the appropriate domain for the technique applied, or may already be converted.

The method further comprises combining the mechanical and/or acoustic vibration data and the system reference data and applying a digital FIR filter to at least the mechanical and/or acoustic vibration data, e.g. to the mechanical and/or acoustic vibration data or a processed version thereof or to a combination of the mechanical and/or acoustic vibration data and the system reference data. In the present example, the latter is obtained by demodulating the mechanical and/or acoustic vibration data and applying a digital low-pass FIR filter, as will be described in more detail in the following steps. Embodiments according to the present invention nevertheless are not limited thereto.

The method for tracking orders 100 furthermore comprises combining 140 the mechanical and/or acoustic vibration data with the system reference data. Combining the data may for example be performed by multiplying the mechanical and/or acoustic vibration data per observation period with the respective order carrier wave(s). This process is also known as demodulation. The latter may, for an order $X_k(p(\alpha))$, a vibration and/or acoustic measurement data $x(\alpha)$ and an order carrier wave $$e^{\frac{jk\alpha}{Q}}$$

be expressed as $$x(\alpha)e^{\frac{jk\alpha}{Q}} \quad [3]$$

with p the reference angular speed or a derived parameter, for example a multiple or fraction of it.

After combining the mechanical and/or acoustic vibration data with the system reference data, the method comprises applying 150 a FIR filter to the combined data. The latter results in filtered results, providing an estimate for the order $\hat{X}_k(p(\alpha))$. This can be mathematically expressed, with $B_k^\alpha$ the angle-domain order bandwidth, as:

$$\hat{X}_k(p(\alpha)) = FIRLowPass(B_k^\alpha, \alpha) \otimes x(\alpha)e^{\frac{jk\alpha}{Q}} \quad [4]$$

The latter represents the application of a low-pass FIR filter of bandwidth $B_k^\alpha$ and with minimum phase distortion to the combined signal, i.e. the phasor shifted signal, to extract order information, e.g. the complex order envelope, and remove all the additional side bands that were introduced. Applying a FIR filter may be performed in any suitable way. Design of the FIR filter corresponds with selection of the coefficients in the filter such that the filter has specific characteristics. The required characteristics may be based on filter specifications. Such filter specifications may be a function of the frequency response of the filter. The filter design may be determined using different methods, such as for example based on a window design method, a frequency sampling method, a weighted least squares design, a minimax design, an equiripple design etc. The actual design of the FIR filter thereby may be a trade-off between the (i) amount of data needed to run the filters, (ii) the computation effort required and (iii) the accuracy of the filter. A FIR filter that produces a sharp cut-off along with a flat pass-band generally consists of a large number of taps. Such filter better separates order components, but is computationally more demanding, since the computational load is proportional with the product of the number of filter taps and the sampling frequency. Applying a FIR filter provides the advantage that an accurate order tracking technique is obtained.

After application of the FIR filter to the combined results, the obtained filtered results represent the order information, thus allowing to track the order. Comparison of the order information between subsequent samplings thus may allow tracking of the order, resulting in a full track of the order during the experiment. Such an order tracking may comprise tracking the amplitude profile and/or tracking the phase profile of at least one order in a mechanical vibration. In order to track the order, the complex envelope of at least one order component may be extracted over time, angle, rotational speed or any derived variable.

Figure 2:
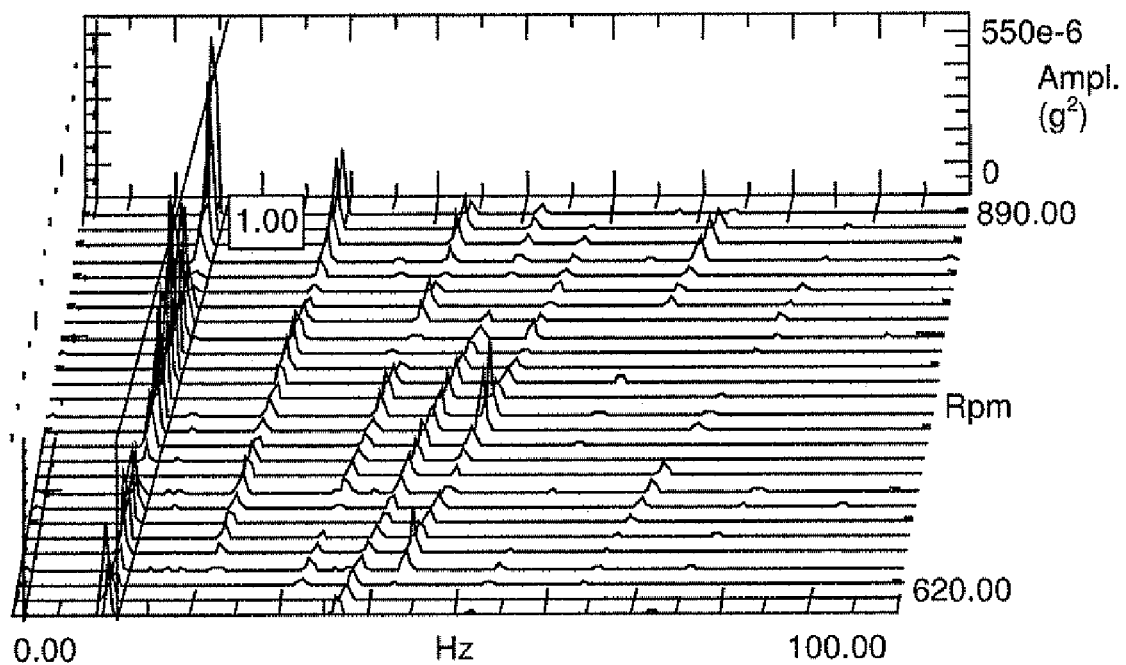
FIG. 2 is an example of a waterfall spectrum of a run-up vibration signal or corresponding data, illustrating the presence and evolution of different order components with rotational speed, as can be obtained using embodiments according to the present invention.
Figure 3:
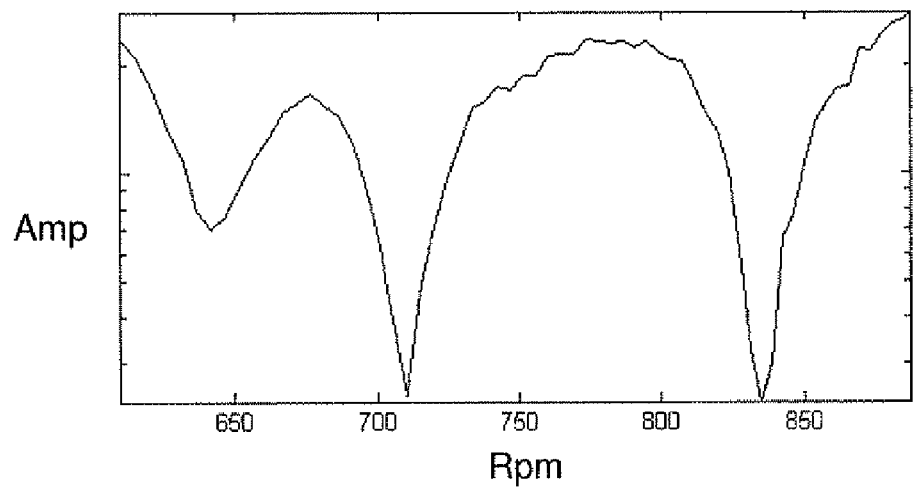
FIG. 3 is an illustration of the first order amplitude profile as function of the rotational speed as identified from the signal or data shown in FIG. 2.

By way of illustration, the present invention not being limited thereto, an example of a run-up order tracking experiment is shown in FIG. 2, whereby in FIG. 3 the amplitude profile of the first order is shown.

The method for order tracking 100 furthermore may comprise outputting 160 data regarding the at least one tracked order. The latter may be performed by providing a visualisation of the tracked order, or it may be performed in electronic way. Outputting may be performed to generate an input signal for a control system, controlling the physical system under study, in order to adjust the control of the physical system, e.g. in an optimisation procedure.

It is an advantage of embodiments according to the present invention that the order tracking method works properly as long as the angle-domain order bandwidth is smaller than half the order resolution. The order envelope may vary over the observation interval.

It is an advantage of embodiments according to the present invention that order tracking in the mechanical and/or acoustic vibrations may be performed in real-time. It also is an advantage of embodiments according to the present invention that the order tracking process of embodiments according to the present invention can better deal with fast varying orders, fast varying system reference data values and closely spaced orders. The latter allows that with the methods and systems according to embodiments of the present invention, physical systems that have a fast ramp-up or a fast coast-down or fast varying system data or closely spaced orders (e.g. a closely spaced engine and gearbox order) still can be studied, analysed, evaluated, etc.

One, more or preferably all steps of the above described method may be performed by a computing device. One, more or all of the steps of the above described method may be performed in an automated or automatic way. Steps of the order tracking method may be based on predetermined algorithms and decisions taken in the algorithm may be based on basic rules, predetermined requirements, neural network processing, etc.

In the above illustrated example, the mechanical and/or acoustic vibration data first is demodulated with the order carrier wave, for which the order carrier frequency is proportional to the angular seed or a multiple or fraction thereof. Such a demodulation is performed in the present example by multiplying the mechanical and/or acoustic vibration data with the carrier wave in the angle domain. The latter results in phasor-shifted data, around DC. Thereafter, an angle-domain low pass FIR filter is applied to the phasor-shifted mechanical and/or acoustic vibration data. Such a FIR filter is designed once and does in principle not need to change during the run-up. It thus may be a fixed FIR filter. Applying the FIR filter comprises multiplying the phasor-shifted data with the filter taps of the filter. Nevertheless, in particular embodiments of the present invention, the order tracking technique can also be used directly in the time-domain, wherein the mechanical vibration data may be originally recorded. The latter thus may allow to avoid resampling of the time domain to the angle domain and also avoids the error incurred by the resampling. An adaptive FIR filter is used which is computed once for each desired system reference parameter value and applied on all system response points of interest. The filter may be adaptive by adjusting the filter length, i.e. the number of taps, over a variation in the system reference, in order to maintain the same angle domain cut-off (e.g. $1/(2Q)$). E.g. in case of a run-up of a rotational speed experiment, the filter length may be adapted in order to maintain the same angle-domain cut-off at low RPM's and at high RPM's. The adoption of an adaptive FIR filter in the time domain is illustrated in the example below. Since the time domain approach according to this particular embodiment combines adaptive filtering and amplitude demodulation in a single computation run, it may be referred to as adaptive amplitude demodulation order tracking.

According to a particular embodiment of the present invention, a method as described above is provided, wherein furthermore a down-decimation technique is applied resulting in production of a single order estimate per observation frame. The latter is achieved by applying the FIR filter only once per observation frame, requiring only a single multiplication of the phasor-shifted data segment by the vector of filter taps. This allows designing a filter which not only produces a sharp cut-off and flat pass-band, but which is also computationally efficient, and if desired, applicable in real-time. It is to be noticed that the down-decimation is not endless. It imposes a restriction on the filter's cut-off frequency and vice-versa. To avoid aliasing, the order sampling rate must be larger than the twice the filter bandwidth.

It is to be noticed that, for both the angle and time domain formulations of the order tracking method, a Fourier Transform based computation scheme can also be adopted, which yields the same results, but better performance for high channel count/orders. Such a Fourier Transform based computation scheme may comprise applying a Fourier Transform of the mechanical vibration data, applying a Fourier Transform of a band-pass FIR filter and combining the two Fourier Transform results, e.g. by multiplying the spectral lines, as also described above. Applying the digital FIR filter then is performed by combining the two Fourier Transform result. Combining the mechanical vibration data and the system reference data then is performed indirectly by using a band-pass FIR filter as this implies centering a FIR filter around the carrier frequency of the order for which the system reference data is used in order to find the carrier frequency and by combining the Fourier Transform of this band-pass FIR filter with the Fourier Transform of the mechanical vibration data.

The methods and systems according to embodiments of the present invention may be used for example in design departments of automotive companies. They may be used in a way dedicated to the design of new engines, new gear boxes, for matching engine and power train components, etc. In one aspect the present invention therefore also relates to a method for order tracking, whereby the obtained output regarding the at least one tracked order is used as feedback for adjusting a design or construction of a physical system. Based upon the output, a variation of components and properties of a physical system may be performed. The latter could be applied in a trial and error fashion, by varying parameters within a predetermined range, etc. Such a method may be performed in an automated and/or automatic way, embodiments of the present invention not being limited thereto.

Figure 4:
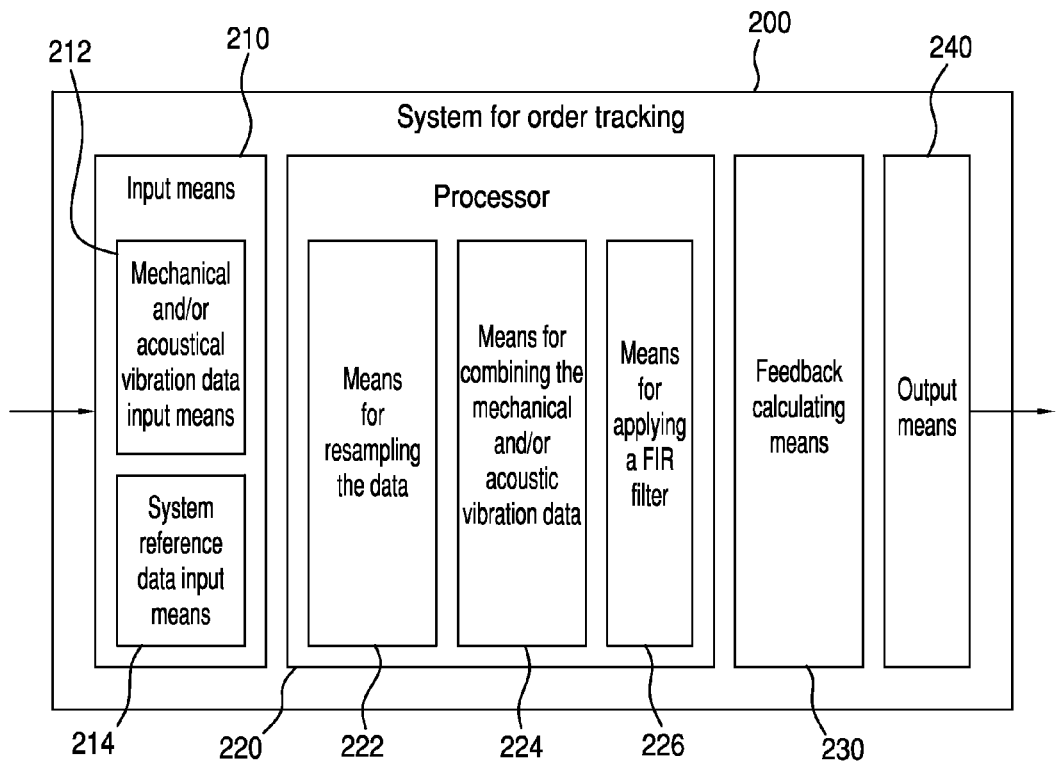
FIG. 4 is a diagrammatic representation of standard and optional components of an order tracking system according to an embodiment of the present invention.

In a second aspect, the present invention relates to a system for order tracking. Such a system may comprise one, several or all components having the functionality of performing a method as described in embodiments of the first aspect of the present invention. The system for order tracking may be made in hardware as well as in software, in the latter case being suitable for operating on a computing device. By way of illustration, the present invention not being limited thereto, an example order tracking system according to an embodiment of the present invention is shown in FIG. 4, indicating standard and optional components of the system. The system 200 comprises an input means 210 for receiving one or multiple mechanical and/or acoustic vibration data of a physical system and for receiving system reference data. The system reference data thereby relates to a parameter of the physical system influencing the vibration spectrum, such as for example a rotation speed of a component present in the physical system. The input means 210 may comprise a separate input means 212 for the mechanical and/or acoustic vibration data and a separate input means 214 for the system reference data. The input means 212 for the mechanical and/or acoustic vibration data may comprise a detection means for detecting the mechanical and/or acoustic vibration data or may be connected to it to receive data or input signals from it. Such a detection means thus may be part of or external to the input means 100. The detection means may be adapted for converting a mechanical and/or acoustic vibration signal in an electric vibration signal and mechanical and/or acoustic vibration data. Similarly, the input means 214 for the system reference data may comprise a detection means for detecting the system reference data or may be connected to it to receive data or input signals from it. Such a detection means thus may be part or external to the order tracking system. Alternatively or in addition thereto, the input means also may be connected to a memory where the input data are stored. The input may be received real-time, i.e. by recording it directly at the physical system and having it directly as an input, or it may concern stored data. The order tracking system 100 furthermore comprises a means for combining 224 the mechanical and/or acoustic vibration data and the system reference data and a means 226 for applying a FIR filter. The means for combining 224 and means for applying 226 may be performed by a processor with suitable software running on it or by dedicated hardware processor. Extracting the orders may thus be achieved by determining a complex envelope of at least one order component from the filtered data. Such a processor 220 may further optionally comprise a means for resampling the data 222 to the appropriate domain in which the applied FIR filter operates. As in principle the different order components will be present in the processed data, the system may be adapted for deriving different order components from the data. The processor 220 may be any suitable processor such as for example a microprocessor, a digital signal processing device, a programmable digital logic device such as a Programmable Array Logic (PAL), a Programmable Logic Array, a Programmable Gate Array or a Field Programmable Gate Array (FPGA), etc. The system furthermore may comprise an output means 240 for outputting the obtained order component information. Such an output means 240 may be a visualisation means for visualising the obtained results, or it may be a data port for providing output to an external component. The output means 240 may be adapted for outputting control information for controlling a system in agreement with the obtained results. More particularly, in some embodiments according to the present invention, the system furthermore may comprise a feedback calculating means 230 for determining a feedback and/or adapted control system for adapting the system operation in view of the obtained order tracking information. The latter may for example be based on a predetermined algorithm, comparison with previously obtained results, e.g. stored locally, based on predetermined rules, based on neural networking etc. Such feedback may be provided in an automatic and/or automated way.

In one embodiment, the present invention not being limited thereto, part of the system or the complete system may be built in a handheld device. The latter is especially advantageous if the detection means for detecting the mechanical and/or acoustic vibrations is incorporated in the hand held device.

The output of the order tracking system may be used in a plurality of applications. As described above, the output of the order tracking system may be used as feedback for controlling the physical system. Therefore, the present invention also relates to a self-regulating physical entity comprising both the physical system and an order tracking system, such that based on the determined tracked order information, the system can be automatically or semi-automatically controlled or adjusted. For example, such an entity may comprise a physical system generating a mechanical and/or acoustic vibration by a moving component in the physical system, an order tracking system as described above and a controller for controlling the physical system taking into account the results obtained in the order tracking system. The order tracking system then may be used as feedback module and the system may be operated according to predetermined standards. Upon generation of information in the order tracking system, the controller may either adjust the system parameters in order to adjust the operation of the order tracking system, leave the operation of the physical system as is or shut down the physical system and optionally provide an error message.

The output of the order tracking system furthermore may be used as an input for simulation of a mechanical and/or acoustic vibration, e.g. in simulation software. The latter may for example be used for software games, test benches, design systems, etc. Based on the tracked orders, simulation of the sound may be performed. It thereby is an advantage that the different orders in the vibration spectra may be determined for one set of conditions, whereby the simulation may be performed for another set of conditions, thus allowing to pro-actively determine the corresponding mechanical and/or acoustic vibration in conditions not experimentally tested. Such a simulation thus takes into account the order tracking information determined with the proposed order tracking method.

Figure 5:
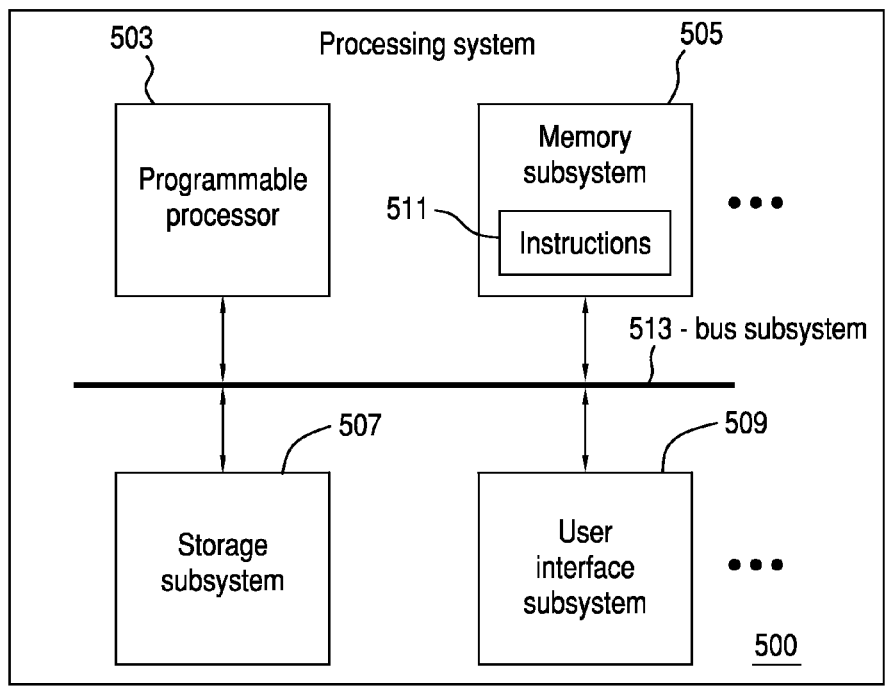
FIG. 5 is a schematic view of a computer system that may be used to implement a method and/or system according to an embodiment of the present invention.

The above-described method embodiments of the present invention may be implemented in a processing system 500 such as shown in FIG. 5. FIG. 5 shows one configuration of processing system 500 that includes at least one programmable processor 503 coupled to a memory subsystem 505 that includes at least one form of memory, e.g., RAM, ROM, and so forth. It is to be noted that the processor 503 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 507 that has at least one disk drive and/or CD-ROM drive and/or DVD drive. In some implementations, a display system, a keyboard, and a pointing device may be included as part of a user interface subsystem 509 to provide for a user to manually input information. Ports for inputting and outputting data also may be included. More elements such as network connections, interfaces to various devices, and so forth, may be included, but are not illustrated in FIG. 5. The various elements of the processing system 500 may be coupled in various ways, including via a bus subsystem 513 shown in FIG. 5 for simplicity as a single bus, but will be understood to those in the art to include a system of at least one bus. The memory of the memory subsystem 505 may at some time hold part or all (in either case shown as 511) of a set of instructions that when executed on the processing system 500 implement the steps of the method embodiments described herein. Thus, while a processing system 500 such as shown in FIG. 5 is prior art, a system that includes the instructions to implement aspects of the methods for tracking orders in a mechanical and/or acoustic vibration spectrum using a FIR filter is not prior art, and therefore FIG. 5 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

By way of illustration, the present invention not being limited thereto, a number of examples are shown, illustrating features and advantages according to embodiments of the present invention.

Figure 6:
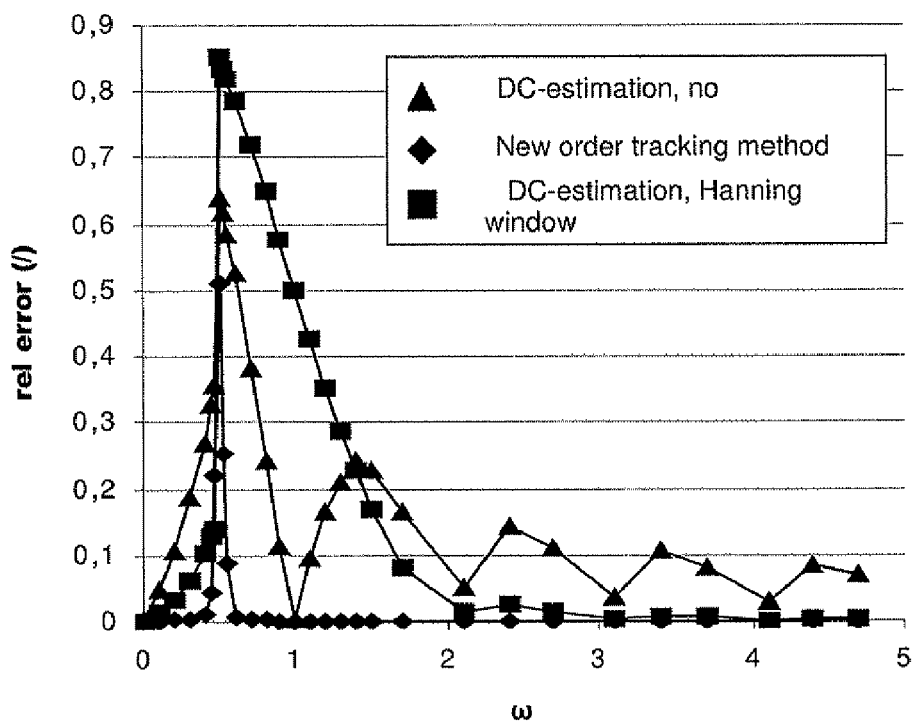
FIG. 6 shows a performance analysis of a method for order tracking according to an embodiment of the present invention in comparison to the known DC-estimation approach applying a uniform window or a Hanning window.

A first example illustrates the new order tracking method in comparison to other order tracking methods, indicated in FIG. 6. The simulations consist of a single order with a constant unity amplitude but oscillating phase, i.e. $X_k(\rho(\alpha))=e^{j\omega\alpha}$. In order to investigate the errors, the oscillation frequency $\omega$ was moved from 0 to 5 in steps of 0.1. Order tracking was done by employing time-domain DC-estimation, with uniform and Hanning windows applied, and by employing a method according to an embodiment of the present invention. The order resolution $1/Q$ was always 1. For all $\omega$ values smaller than 0.5 (the limit of what belongs to the order), the order estimate was compared to the input order $X_k$. For all $\omega$ values larger than 0.5, the order estimate was compared to 0, since an ideal order estimator would find this data or signal to consist entirely of orders different from $X_k$. FIG. 6 illustrates the order estimation errors of both methods when tracking an order that is not constant over the observation period, i.e. $B^\alpha_k$ larger than 0. This example illustrates that the order tracking method according to embodiments of the present invention is better than the DC-estimation based order tracking method. It can be seen that cross-talk errors occur in the DC-estimation when the order bandwidth differs from zero. A typical sinc behaviour of DC-estimation with a uniform window and an inherent cross-talk error of 0.5 for $\omega=1$ can be seen when using a Hanning window. The new order tracking method does not suffer from order cross-talk as long as $\omega<0.5$, i.e. $B^\alpha_k<0.5/Q$ By way of illustration, embodiments of the present invention not being limited thereto, a more detailed description of an exemplary method and system for order tracking is described below, with reference to FIG. 7 and FIG. 8.

The example is worked out for a rotating system, such as a combustion engine, with a number of shafts $S_l$, although the invention is not limited thereto. For the ease of interpretation, all excitations in the system are supposed to be caused by the rotation of the shafts, methods and systems according to embodiments of the present invention not being limited thereto. In such system, often there are several independent rotations going on at once. For the sake of simplicity, we assume for this example only one rotational cause.

In the example given, all shafts are tied such that their rotational speeds are proportional. The ratio of the rotation angles of a shaft $S_i$ and an arbitrary reference shaft $S_0$ is a rational number as expressed in equation [5]. The rotation angles of a shaft $S_i$ thus is indicated as $S_i.\alpha$. Equation [5] means that if we know the reference shaft angle $S_0.\alpha$ (rad), we also know the angles of all the other shafts.

$$\frac{S_i \cdot \alpha}{S_0 \cdot \alpha} = \frac{S_i \cdot q}{S_0 \cdot p} \in Q; S_i \cdot q, S_0 \cdot p \in N \quad [5]$$

The system excitation x at a certain response point depends on a plurality of system's state $\sigma$, e.g. torque, throttle, rotational speed, temperature, etc., and the shaft angles. Since it suffices to know one angle to know all others, we can state that x is a function of the state and the reference shaft rotation angle:

$$x(\sigma, S_0.\alpha) \quad [6]$$

Since the state $\sigma$ a is multidimensional, it would be hard to do repeatable measurements if all of these parameters were to vary. Therefore, all but one of these parameters is supposed to be under environmental control, such as for example on a roller bench for vehicles. Typically, this reduces the state a to just one parameter, for example the rotational speed of the reference shaft.

If the rotational speed of the reference shaft is expressed as $S_0.\rho(rad/s)$, then the equation for x becomes:

$$x(S_0.\rho, S_0.\alpha) \quad [7]$$

For reasons of convenience, the $S_0$ prefix will be omitted henceforth:

$$x(\rho, \alpha) \quad [8]$$

Furthermore, since all angles are proportional, as indicated in equation [5], a section for constant rotational speed $\rho$ is actually a periodic function, with period the smallest common integer multiple of $S_i.q$, henceforth called Q. The inverse of the smallest common integer multiple of $S_i.q$, i.e. 1/Q, is also known as the order resolution.

Because of the periodic nature of x, this function simplifies in the order-domain. Suppose r is the order number, then the order-domain function is as follows:

$$X(\rho, r) = 0 \text{ if } r \text{ is not a multiple of } \frac{1}{Q} \quad [9]$$
$$= X_k(\rho) \text{ if } r = \frac{k}{Q}$$

Figure 7:
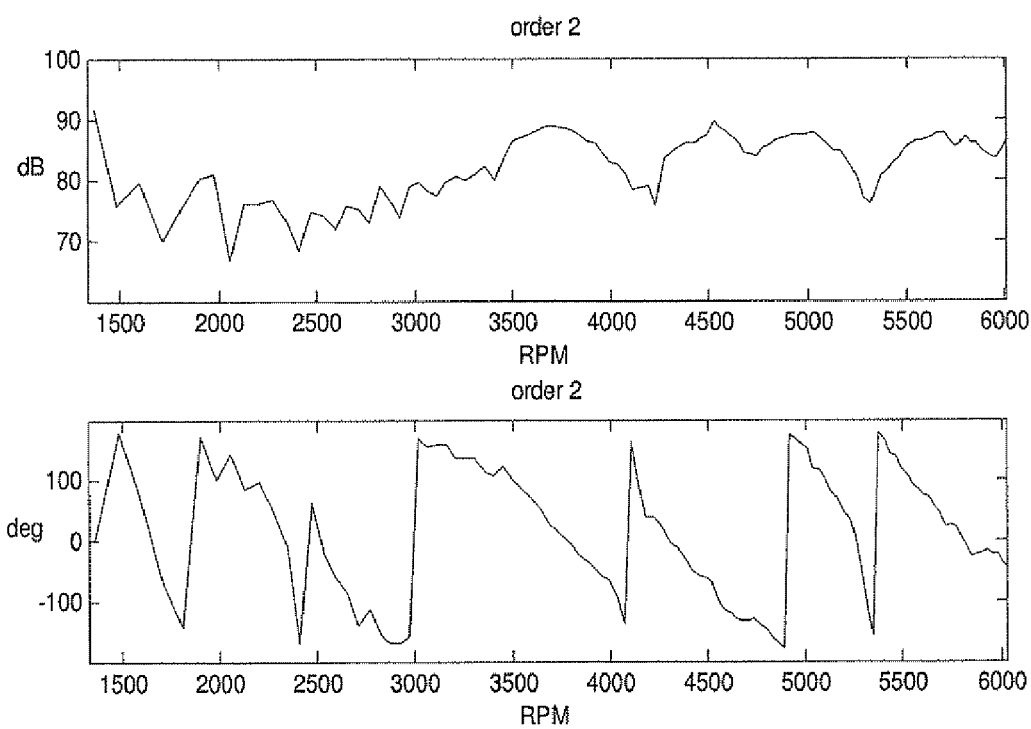
FIG. 7 shows an example of an order 2 profile for an acoustic response point inside the passenger compartment of a vehicle as can be studied using a method for tracking according to an embodiment of the present invention.

The relation between the angle- and order-domain functions can be formulated as:

$$x(\rho, \alpha) = \sum_{k=-\infty}^{\infty} X_k(\rho) e^{\frac{jk\alpha}{Q}} \quad [10]$$

where $X_k(\rho)$ is a continuous complex function, representing the order envelope of the k/Q'th order component of x. The amplitude and phase profile of an order component is varying with rotational speed. This is illustrated in FIG. 7, which shows the order 2 envelope for an acoustic response point in the passenger compartment of a vehicle, in the present example being a 4-cylinder car. In the present example, the order bandwidth $B^\rho_k$ is clearly different from zero. The order bandwidth $B^\rho_k$ depends on the system's transfer function characteristics. Orders crossing a frequency region with strong modal density typically have a large order bandwidth. Their amplitude and phase profile rapidly varies with rotational speed.

For the above example of a rotating shaft machinery, the order tracking is further illustrated. The goal of order tracking is to estimate the order profiles $X_k(\rho)$ from measurement data, e.g. acoustical or mechanical vibration data. They are typically estimated by sweeping the rotational speed $\rho$ over a certain range in a run-up or coast-down experiment. Of course, also other types of tests can be performed. A tacho pulse signal is typically measured to obtain the rotational speed. It is also used to resample the time-data x(t) to the angle-domain and serves as a phase reference.

Figure 8:
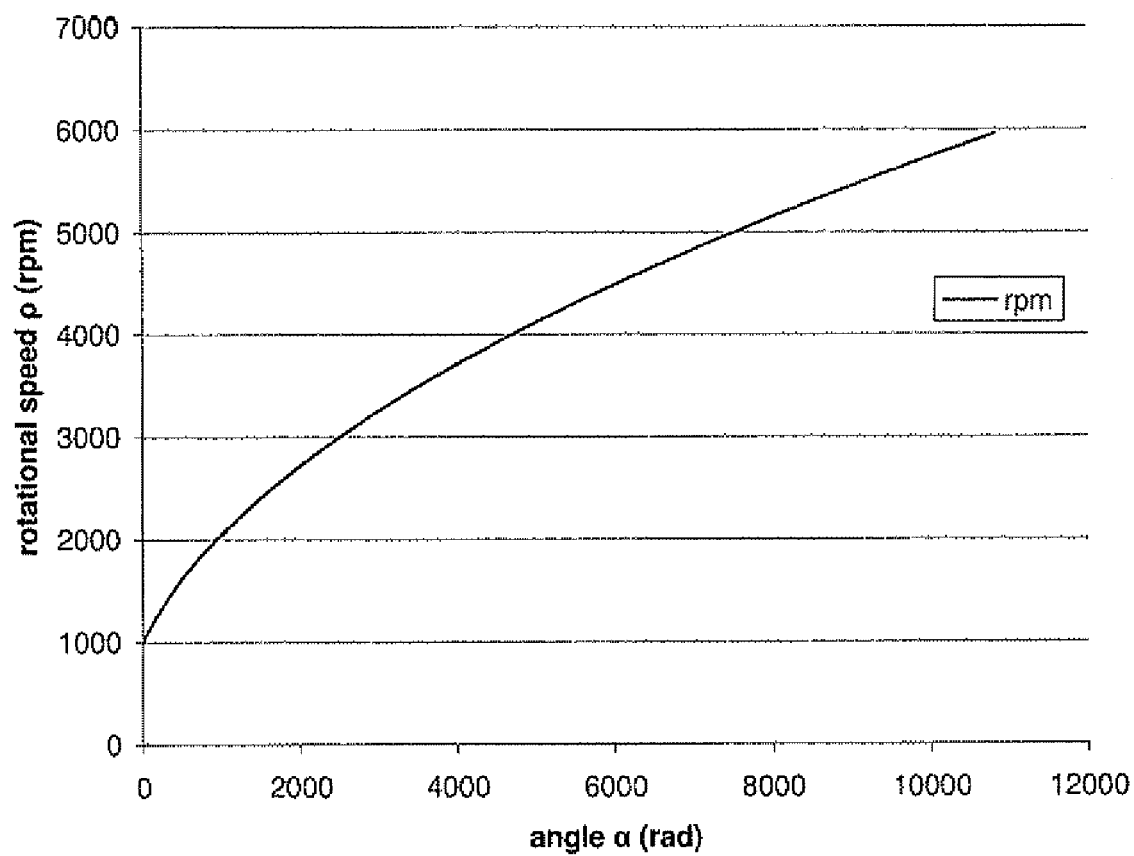
FIG. 8 shows an example of the rotational speed as function of the angle for a linear run-up in speed from 1000 RPM to 6000 RPM in 30 seconds, as can, for example, be used as reference signal or corresponding reference data in a method for order tracking according to an embodiment of the present invention.

By resampling the measured time-data x(t) to the angle-domain, we obtain:

$$x(\alpha) = \sum_{k=-\infty}^{\infty} X_k(\rho(\alpha)) e^{\frac{jk\alpha}{Q}} \quad [11]$$

where the rotational speed $\rho$ varies with $\alpha$. By way of illustration, embodiments of the present invention not being limited to it, FIG. 8 shows an example of the rotational speed $\rho$ as a function of the rotation angle $\alpha$ for a linear engine run-up from 1000 to 6000 RPM in 30 s. Equation [11] can be read as a composite amplitude modulation of the orders $X_k(\rho(\alpha))$ with $$e^{\frac{jk\alpha}{Q}}$$

the carrier wave for order k/Q. Suppose that the order $X_k(\rho(\alpha))$ has an angle-domain bandwidth $B^\alpha_k$, expressed in 1/rad. If all orders are amplitude modulated into the measured function $x(\alpha)$, demodulation should be sufficient to know the orders. As long as $B^\alpha_k < 0.5/Q$, there will be no interference between all modulations of all orders and they can be picked up separately from the data.

Suppose the order $X_k(\rho(\alpha))$ has a bandwidth $B^\alpha_k < 0.5/Q$. Demodulation is then achieved in two steps. First, the measurement data $x(\alpha)$ is multiplied per observation frame with the order carrier wave, such that the resultant data signal is now centered about zero. Then, a low-pass filter of bandwidth $B^\alpha_k$ and with minimum phase distortion is applied to the phasor-shifted data to extract the complex order envelope and remove all the additional side bands that have been introduced. This is expressed, mathematically, in equation [12].

$$\hat{X}_k(\rho(\alpha)) = LowPass(B^\alpha_k, \alpha) \otimes x(\alpha) e^{\frac{jk\alpha}{Q}} \quad [12]$$

The ideal low-pass filter is the sinc filter:

$$\hat{X}_k(\rho(\alpha_0)) = \left(\text{sinc}(\alpha) \otimes \left(x(\alpha) e^{\frac{jk\alpha}{Q}}\right)\right)(\alpha_0) \quad [13]$$

However, since the sinc filter is of infinite length, it is replaced by a FIR filter of finite length.

In the above example, the principle of order tracking according to embodiments of the present invention is expressed in the angle-domain formulation. As discussed above there are possibilities to avoid the need for resampling of the measurement data. Next to the angle-domain formulation, embodiments of the present invention therefore also cover the following time-domain variant:

$$\hat{X}_k(\rho(\alpha_0)) = \int_{-\infty}^{\infty} \mathrm{sinc}(\alpha_0 - \alpha(t))\left(x(t)e^{\frac{jk\alpha(t)}{Q}}\right)\frac{d\alpha}{dt}dt \quad [14]$$

By tracking the angle $\alpha$ over time, for any given rotational speed $\rho$ during an experiment with varying system parameter, e.g. during run-up or coast-down experiments with respect to the rotational speed, the corresponding angle $\alpha_0$ can be found. Subsequently, a FIR filter can be defined for $\alpha_0$ that is an approximation of the ideal sinc filter This time-domain approach saves you from resampling the time data to the angle-domain and the error incurred by doing so, and yields an adaptive FIR filter that can be computed once for each desired rotational speed, and applied on all system response points of interest.

It is to be noticed that, for both (i) the angle domain method with angle-domain FIR filter (as approximation for the ideal sinc filter in [13]) and (ii) the time domain variant with adaptive time domain FIR filter (as approximation for the ideal sinc filter in [14]), a Fourier Transform based computation scheme can also be adopted, which yields the same results, but better performance for high channel count/orders.

The proposed order tracking method works properly as long as the order bandwidth in the angle-domain is smaller than half the order resolution, i.e. $B^{\alpha}_k < 0.5/Q$. If not, there is inherent order cross-talk and adjacent orders can not longer be separated. $B^{\alpha}_k$ depends on three parameters: (i) the order bandwidth $B^{\rho}_k$, which depends on the system's transfer function characteristics as mentioned before, (ii) the instantaneous angular acceleration $d\rho/dt$ and (iii) the instantaneous rotational speed $\rho$. If $\alpha(t)$ is more or less parabolic over a run-up, one can prove that:

$$B^{\alpha}_k \approx \frac{\frac{\partial \rho}{\partial t} B^{\rho}_k}{\rho} \quad [15]$$

This means that, for a certain rotating system, the risks for inherent order cross-talk will increase with increasing run-up speed. There is a maximum tolerable run-up speed for which $B^{\alpha}_k = 0.5/Q$. As long as this speed is not exceeded during the measurements, the order components can be well separated, which is not the case with the existing DC-estimation methods.

It is to be understood that although preferred embodiments, specific constructions and configurations, as well as materials, have been discussed herein for devices according to the present invention, various changes or modifications in form and detail may be made without departing from the scope of this invention as defined by the appended claims. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. An order tracking system (200) for tracking at least one order from mechanical and/or acoustic vibrations generated by a periodic excitation process of a physical system, the order tracking system (200) comprising
    means (212) for obtaining mechanical and/or acoustic vibration data of a physical system and a means (214) for obtaining system reference data characterizing the angular speed of the excitation process,
    means (224) for demodulating the mechanical and/or acoustic vibration data by multiplying it with the order carrier wave(s) of which the frequency evolution is a multiple or fraction of the angular speed of the periodic excitation process, and
    means (226) for applying a digital FIR filter to the demodulated mechanical and/or acoustic vibration data for deriving based thereon at least one order.

2. An order tracking system (200) according to claim 1, wherein the system reference data is an angular speed of the periodic excitation process, a multiple or fraction of it, a corresponding oscillator, a tacho pulse train, or any variable derived therefrom.

3. An order tracking system (200) according to claim 1, wherein the order tracking system (200) operates in the angle-domain and/or wherein the order tracking system (200) operates an adaptive FIR filter in the time-domain.

4. An order tracking system (200) according to claim 1, wherein the means (226) for applying a digital FIR filter applies a digital low pass FIR filter to the combined mechanical and/or acoustic vibration data and the system reference data.

5. An order tracking system (200) according to claim 1, wherein the means (212) for obtaining mechanical and/or acoustic vibration data obtains a sampled mechanical and/or acoustic vibration data in different finite observation frames wherein the data is periodic and wherein the means for combining (224) performs said combining once per corresponding observation interval using the data in this observation interval, or wherein the means for obtaining (212) mechanical and/or acoustic vibration data obtains sampled mechanical and/or acoustic vibration data in different finite observation frames and wherein the means for applying (226) the digital FIR filter applies the digital FIR filter once per observation frame.

6. An order tracking system (200) according to claim 1, wherein the means for applying (226) a digital FIR filter is a means for applying a digital FIR filter having a cut-off frequency which is smaller than half an order resolution of the order of interest.

7. An order tracking system (200) according to claim 1, wherein the system (200) furthermore comprises a means for detecting the mechanical and/or acoustic vibrations from the physical system and converting it into mechanical and/or acoustic vibration data.

8. An order tracking system (200) according to claim 1, wherein an order sampling rate is selectable by the user.

9. An order tracking system (200) according to claim 1, the order tracking system (200) furthermore comprising an output means (240) for putting out order information.

10. An order tracking system (200) according to claim 1, wherein a Fourier Transform based computation scheme is adopted.

11. An order tracking system (200) according to claim 1, wherein the means for combining (224) and means for applying (226) comprise means for obtaining a Fourier Transform of the mechanical and/or acoustic vibration data, a means for obtaining a Fourier Transform of a bandpass FIR filter and a means for combining the Fourier Transform of the mechanical and/or acoustic vibration data and the Fourier Transform of the bandpass FIR filter.

12. An entity comprising a physical system and an order tracking system (200) according to claim 1, wherein the order tracking system (200) provides information to the physical system regarding its mechanical and/or acoustic vibration frequency spectrum.

13. An entity comprising a simulation system and an order tracking system (200) according to claim 1, the simulation system provides simulation of a mechanical and/or acoustical vibration signal(s) using order information generated with said order tracking system (200).

14. An order tracking system (200) according to claim 1, wherein the order tracking system (200) operates an FIR filter in the time-domain, such that the filter length is adjusted over a variation in the system reference data in order to maintain an angle domain cut-off to be the same over the variation in the system reference data.

15. A method (100) for tracking at least one order from mechanical and/or acoustic vibrations generated by a periodic excitation process of a physical system, the method comprising
   obtaining (110) mechanical and/or acoustic vibration data of a physical system,
   obtaining (120) system reference data characterising the angular speed of the excitation process,
   demodulating the mechanical and/or acoustic vibration data by multiplying it with the order carrier wave(s) of which the frequency evolution is a multiple or fraction of the angular speed of the periodic excitation process and applying (150) a digital FIR filter to the demodulated mechanical and/or acoustic vibration data for deriving based thereon at least one order.

16. A method (100) according to claim 15, wherein the tracking of at least one order operates in the angle-domain.

17. A method (100) according to claim 15, wherein applying (150) a FIR filter comprises applying an adaptive FIR filter in the time-domain.

18. A method (100) according to claim 15, wherein applying (150) a digital FIR filter comprises applying a digital low pass FIR filter to the combined mechanical and/or acoustic vibration data and the system reference data.

19. A method (100) according to claim 15, wherein obtaining (110) mechanical and/or acoustic vibration data comprises obtaining mechanical and/or acoustic vibration data in different observation frames and wherein the combining (140) is performed once per observation interval.

20. A method (100) according to claim 15, wherein combining (140) and applying (150) comprise
   obtaining a Fourier Transform of the mechanical and/or acoustic vibration data,
   obtaining a Fourier Transform of a bandpass FIR filter, and
   combining the Fourier Transform of the mechanical and/or acoustic vibration data and the Fourier Transform of the bandpass FIR filter.

21. A method (100) according to claim 15, obtaining (110) mechanical and/or acoustic vibration data comprises obtaining mechanical and/or acoustic vibration data in different observation frames and wherein applying a digital FIR filter comprises applying a digital FIR filter once per observation frame.

22. A method (100) according to claim 15, the method (100) comprising controlling a physical system as function of said derived order information or comprising simulating a mechanical and/or acoustic vibration using said derived order information.

23. A non-transitory computer readable medium containing computer instructions stored therein for causing a computer processor to perform the method as claimed in claim 15.

24. Transmission of the computer instructions of claim 23 over a local or wide area telecommunications network.

* * * * *